US010358976B2

(12) United States Patent
Jagtap

(10) Patent No.: US 10,358,976 B2
(45) Date of Patent: Jul. 23, 2019

(54) HEAT RECUPERATION SYSTEM FOR THE FAMILY OF SHAFT POWERED AIRCRAFT GAS TURBINE ENGINES

(71) Applicant: Swapnil Sarjerao Jagtap, Mumbai (IN)

(72) Inventor: Swapnil Sarjerao Jagtap, Mumbai (IN)

( * ) Notice: Subject to any disclaimer, the term of this patent is extended or adjusted under 35 U.S.C. 154(b) by 159 days.

(21) Appl. No.: 15/520,407

(22) PCT Filed: Oct. 14, 2015

(86) PCT No.: PCT/IN2015/000387
§ 371 (c)(1),
(2) Date: Apr. 19, 2017

(87) PCT Pub. No.: WO2016/067303
PCT Pub. Date: May 6, 2016

(65) Prior Publication Data
US 2018/0334959 A1   Nov. 22, 2018

(30) Foreign Application Priority Data

Oct. 29, 2014   (IN) .......................... 3419/MUM/2014

(51) Int. Cl.
*F02C 6/18*   (2006.01)
*F02C 7/047*   (2006.01)
(Continued)

(52) U.S. Cl.
CPC ................ *F02C 6/18* (2013.01); *B64D 41/00* (2013.01); *F02C 3/04* (2013.01); *F02C 7/047* (2013.01);
(Continued)

(58) Field of Classification Search
CPC .... F02C 6/18; F02C 3/04; F02C 7/047; F02C 7/08; F02C 7/10; F02C 6/12; B64D 41/00;
(Continued)

(56) References Cited

U.S. PATENT DOCUMENTS 3,782,457 A * 1/1974 Troy .......................... F02C 7/08
165/158
3,818,696 A * 6/1974 Beaufrere ............... F01D 5/046
165/8

(Continued)

FOREIGN PATENT DOCUMENTS

WO   2012/057848 A1   5/2012

*Primary Examiner* — Justin M Jonaitis

(57) ABSTRACT

Heat recuperation system for the family of shaft powered aircraft gas turbine engines, comprise of a shaft powered gas turbine engine with air inlet system, compressor, combustor, exhaust turbines, engine shaft(s) and exhaust system, where the shaft powered aircraft gas turbine engine has an Annular Finned-Tube Heat Exchanger (AFTHE) located in the exhaust system and a heat recovery apparatus functionally coupled to the AFTHE. The AFTHE with working fluid recovers heat from the exhaust gas. The recovered heat vaporizes the working fluid which drives a turbo-expander. The mechanical work developed by the turbo-expander can be used for driving the propulsion systems, compressor or an electric generator. The thermal energy available after expansion work can be used to heat the inlet air into the engine to prevent ice ingestion during icing conditions. This system increases performance and life of the engine, and reduces emissions, heat released to the environment, fuel consumption and fuel cost.

17 Claims, 6 Drawing Sheets

(51) Int. Cl.
*B64D 41/00* (2006.01)
*F02C 3/04* (2006.01)
*F28F 1/12* (2006.01)

(52) U.S. Cl.
CPC .......... *F28F 1/12* (2013.01); *F05D 2220/323* (2013.01); *F05D 2220/76* (2013.01); *F05D 2260/207* (2013.01); *Y02T 50/671* (2013.01)

(58) Field of Classification Search
CPC ........ B64D 2041/002; F28F 1/12; F28F 1/42; F05D 2220/323; F05D 2220/76; F05D 2260/207; Y02T 50/671; Y02T 10/144; F28D 17/00; F28D 19/00; F28D 21/0001; F28D 20/00; F02B 37/00; F02B 37/02; F02B 37/025; F02B 37/12; F02B 2037/122; F02B 2037/125; F02D 41/0007; F05B 2220/40

USPC ................ 244/58; 165/4, 10, 179, 182, 183; 60/39.511, 605.1, 273
See application file for complete search history.

(56) References Cited

U.S. PATENT DOCUMENTS

| | | | | |
|---|---|---|---|---|
| 4,993,223 | A * | 2/1991 | Kretzinger | F02C 7/08 165/166 |
| 5,581,997 | A * | 12/1996 | Janes | F01D 1/00 60/39.12 |
| 6,363,706 | B1 * | 4/2002 | Meister | F02C 3/10 60/774 |
| 7,775,031 | B2 * | 8/2010 | Wood | F02C 7/10 165/4 |
| 2004/0020206 | A1 * | 2/2004 | Sullivan | F01C 1/0215 60/670 |
| 2011/0179766 | A1 | 7/2011 | Fonseca | |
| 2014/0190162 | A1 * | 7/2014 | Fonseca | F01D 15/005 60/605.1 |

* cited by examiner

HEAT RECUPERATION SYSTEM FOR THE FAMILY OF SHAFT POWERED AIRCRAFT GAS TURBINE ENGINES

FIELD OF INVENTION AND USE OF INVENTION

A representation of the current invention in general is related to recuperation of heat from the exhaust gas of the shaft powered aircraft gas turbine engines. A shaft powered aircraft gas turbine engine is a gas turbine engine which generates thrust by shaft rotation, rotation of propellers or rotation of rotors. Therefore, turbo-prop engines and turbo-shaft engines, both are classified in the family of shaft powered aircraft gas turbine engines. The recovered thermal energy at exhaust of a shaft powered aircraft gas turbine engine is converted to mechanical or electrical energy. Therefore, this recovered thermal energy increases performance and life of engine, and reduces emissions, heat released to the environment, fuel consumption and fuel cost.

Prior Art and Problem to be Solved

In low speed aircrafts (shaft-powered) which includes cargo aircrafts, private aircrafts, fixed-wing and rotor-wing military aircrafts, the engine supplies power to various aircraft utility systems. These aircraft utility systems comprise of Environmental Control System (ECS), pressurization system, the pneumatic system, the water systems, the anti-ice system, and the reservoir pressurization of the hydraulic system. The energy required for the functioning of these systems is extracted from the engine's compressor or by powering an electric generator through exhaust shaft power. Air-conditioning is the second most power consuming process after propulsion, on the aircraft. Therefore, to attain its targeted propulsion output the engine has to function more for the extra energy it expends other than propulsion. The energy dependency of above mentioned aircraft utility systems on the engine causes engine to wear out by reduced performance and life of engine and increases fuel consumption, rotor speed, exhaust gas temperature. The increase in fuel consumption increases the fuel cost, which affects the entity owning these aircraft.

U.S. Pat. No. 3,037,347 A discloses a propeller drive transmission for a gas turbine engine.

U.S. Pat. No. 4,817,382 A discloses apparatus for turbo-prop propulsion.

U.S. Pat. No. 8,001,793 B2 discloses a gas turbine engine reverse flow combustor.

U.S. Pat. No. 3,397,741 A discloses a plate fin tube heat exchanger.

EP 2522828 A3 discloses an Organic Rankine cycle systems using waste heat from charge air cooling.

US 20110179766 A1 discloses heat recovery system in turbofan engines.

U.S. Pat. No. 8,628,025 B2 discloses vehicle waste heat recovery system and method of operation.

OBJECTIVE OF THE INVENTION

The energy from the engine's compressor, or electric generator powered by exhaust shaft work, is utilized to power pneumatic system of an aircraft. This pneumatic system provides filtered and conditioned air to the aircraft's cabin. Contamination of air from hydraulic fuel or oil leakages can result in flight, consignment or mission delays which will affect the revenues of the entity owning the aircraft. Combustion of fuel being an exothermic process generates high energy and high temperature flow of product gases. This high temperature and pressure flow enters the exhaust turbine where it expands to the exhaust pressure. This expansion process produces shaft work output. The shaft powered aircraft gas turbine engines produce maximum of its propulsive force for flight from the propellers or rotors rather than the thrust from exhaust gas. The velocity of exhaust gas is very low to provide considerable thrust. Therefore, the thermal energy of the exhaust gas can be utilized to do work output which can further be used to drive the aircraft utility systems. This helps in reducing the fuel consumption. Less fuel consumption implies less emissions, less heat released to the environment and lower fuel cost. Additionally, the recovered thermal energy increases the engine's performance and life. A major manufacturing and assembly advantage is that the existing systems on aircraft do not change much. This system can be installed on the existing shaft powered aircraft gas turbine engines with minor modifications. The effect of weight addition to the aircraft due to the installation of this complete system can be countered by reducing size of fuel tank with calculated savings in fuel due to addition of this system.

SUMMARY OF THE INVENTION

A representation of the present invention can harness the thermal energy from exhaust gas of the shaft powered aircraft gas turbine engines. This recovered thermal energy converts the working fluid inside the annular finned-tube heat exchanger into vapor to drive a turbo-expander. In one representation of a direct drive shaft powered aircraft gas turbine, the turbo-expander is connected to the engine shaft/exhaust shaft to deliver the recovered energy to the shaft. This enables the engine to consume less fuel to achieve the same amount of output power. In another representation of a direct drive shaft powered aircraft gas turbine engine, the turbo-expander that is installed outside the engine's framework, is coupled to an electric generator which can produce electricity and supply power to the aircraft utility systems. For a reverse flow shaft powered aircraft gas turbine engine, the first representation has the turbo-expander coupled to the exhaust shaft which delivers the recovered energy for propulsion. In the second representation of a reverse flow shaft powered aircraft gas turbine engine, the turbo-expander is coupled to the compressor shaft to deliver the recovered energy to reduce work done by hot gaseous products of combustion for driving the compressor. In the third representation of a reverse flow shaft powered aircraft gas turbine engine, the turbo-expander that is installed outside the engine's framework, is coupled to an electric generator which can supply power to the aircraft utility systems.

DETAILED DESCRIPTION OF THE DRAWINGS

Figure 1:
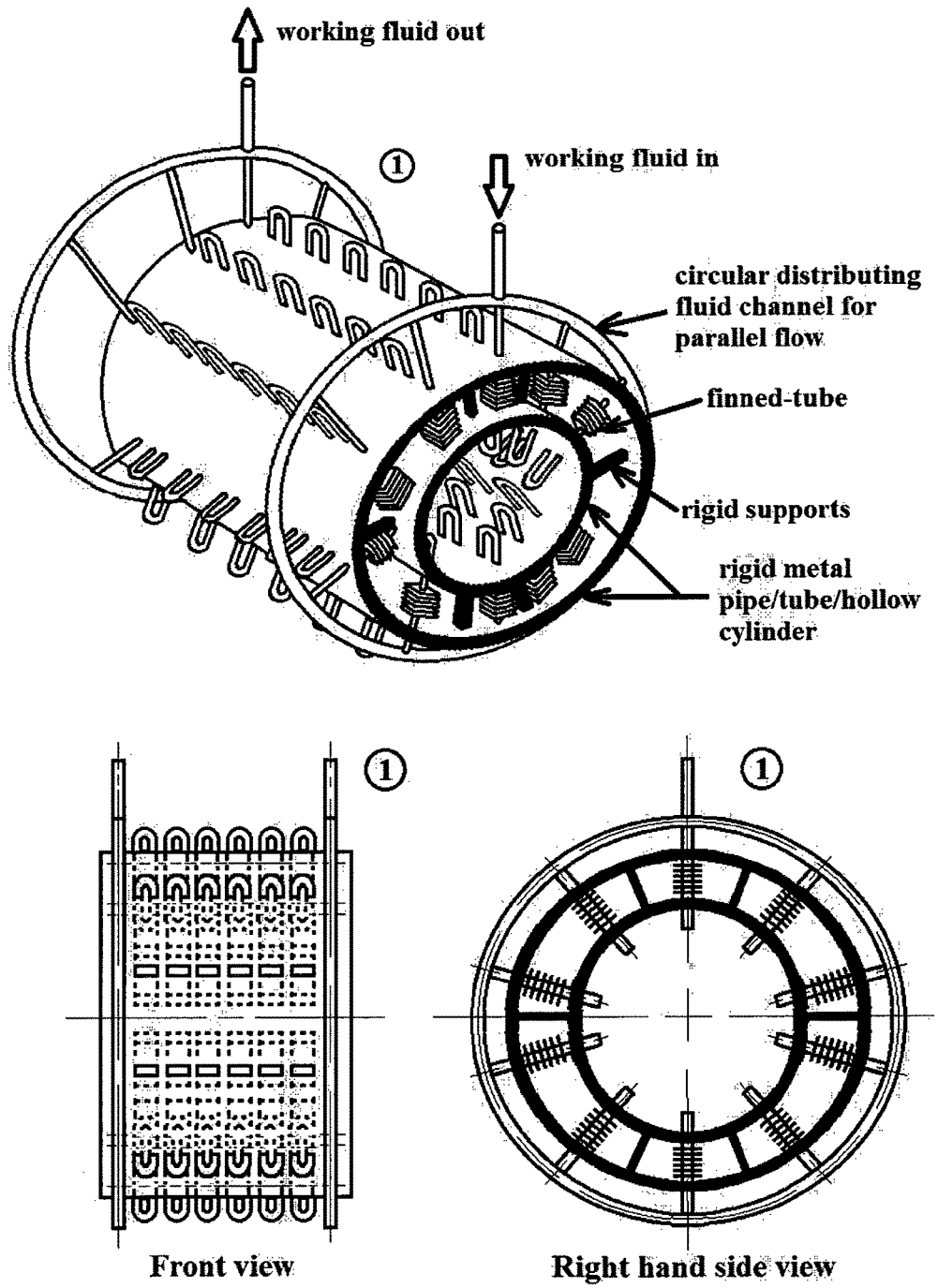
FIG. 1 is a detailed representation of an annular finned-tube heat exchanger (isometric view, front view and right-hand side view).
Figure 2:
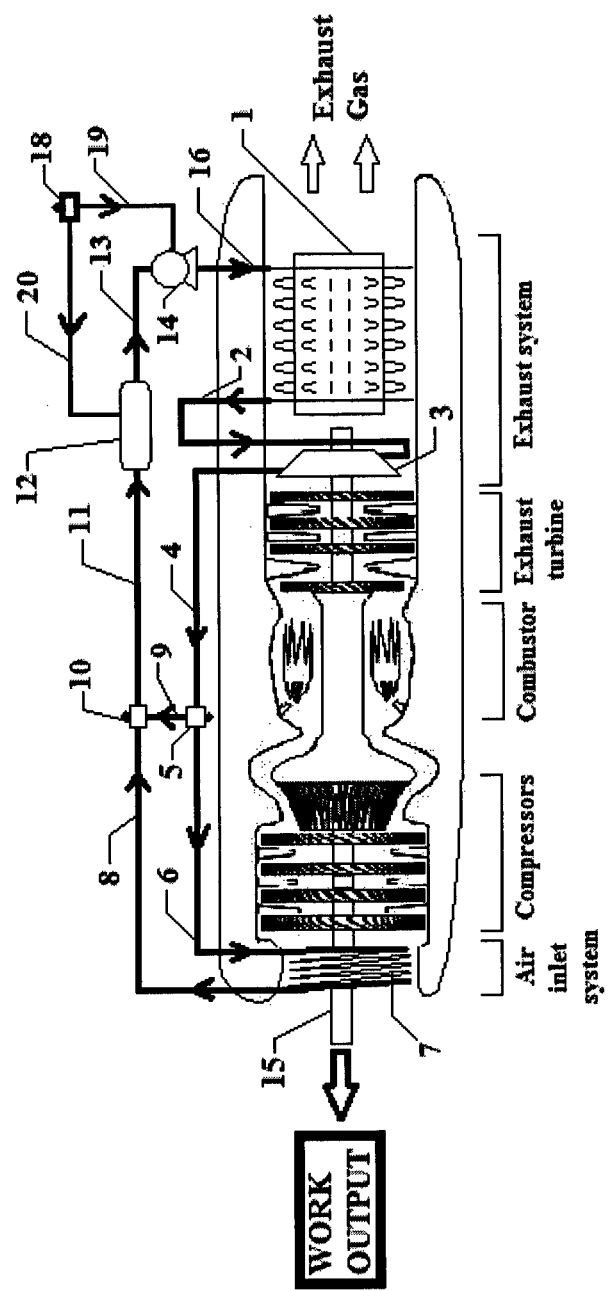
FIG. 2 is a side view of the direct drive shaft powered aircraft gas turbine engine with turbo-expander on the exhaust shaft.

The representation of the present invention is an improved direct drive shaft powered aircraft gas turbine engine. The depiction in FIG. 1 is an annular finned-tube heat exchanger 1. It consists of a set of finned-tubes arranged in circular pattern within the annulus formed by two co-axial metal tubes/pipes/hollow cylinders. For ease in manufacturing, the two co-axial metal tubes/pipes/hollow cylinders can be cut into two halves. The required pattern of the finned tubes can be achieved by welding. The annular region is maintained by providing rigid supports at specific locations along the circumference and the length of the co-axial metal tubes/pipes/hollow cylinders. The rigid supports can be welded between the two co-axial metal tubes/pipes/hollow cylinders or can be formed by using mechanical joints. The finned tubes within each of the half annulus formed (after cutting) are connected/welded along the length of two co-axial half metal tubes/pipes/hollow cylinders, with caps (tubes of U-shape to connect the adjacent finned-tube in order to create 'flat zigzag coil' flow arrangement) except at both the ends. The two ends of each set of 'flat zigzag coil' finned-tubes arranged in circular pattern, are kept open to form a circular parallel-flow arrangement. After the assembly of the finned tubes as described above, the two half annulus can be welded together. All the ends (on the radially outward/outer side) of the finned-tubes in circular arrangement at both ends of the now complete (after welding) metal tube/pipe/hollow cylinder are connected/welded to a fluid channel or tube of circular shape/geometry (i.e. not cross-section wise) to provide parallel flow. This way the annular finned-tube heat exchanger 1 is manufactured. The depiction in FIG. 2 is an improved direct drive shaft powered aircraft gas turbine engine, an annular finned-tube heat exchanger 1 can be installed in the exhaust system. The annular finned-tube heat exchanger 1 fits co-axially in the annulus of the exhaust system of a direct drive shaft powered aircraft gas turbine engine. The fitting can be done by welding metal brackets on the outer circumference of the annular finned-tube heat exchanger 1 and the inner circumference of the exhaust system or any appropriate method. The turbo-expander 3 can be mounted on exhaust shaft 15. For a direct drive shaft powered aircraft gas turbine engine, the compressor shaft and exhaust shaft are one and the same. The exhaust shaft 15 generates required work for propulsion and Electrical Control Unit (ECU). The annular finned-tube heat exchanger 1 can be connected to a turbo-expander 3 by vapor flow channel 2. The orientation of the annular finned-tube heat exchanger 1 is very important. The annular finned tube heat exchanger 1 is oriented in such a way that its outlet which has the hot working fluid leaving it, faces the exhaust turbine-side of the engine's exhaust system, while its inlet with cold working fluid entering it faces the exit-side of engine's exhaust system. This creates a cross counter flow arrangement (combination of cross flow and counter flow) between the working fluid and the exhaust gas, efficiently absorbing the thermal energy from exhaust gas to convert the working fluid into vapor. This orientation of the annular finned-tube heat exchanger 1 is the 'best and the most efficient' way of carrying out the heat recuperation process. As exhaust gas heats working fluid in the annular finned-tube heat exchanger 1, the working fluid changes to vapor. The vapor is transferred from the annular finned-tube heat exchanger 1 to the turbo-expander 3 by vapor flow channel 2. The vapor expands in turbo-expander 3 to generate mechanical work output. The condenser 12 can be connected to sensors 18 to provide signals through information channel 20 for the required condensing rate to achieve maximum thermal efficiency based on ambient conditions like icing or non-icing, and flight conditions like engine start, take-off, cruising or landing. The pump 14 drives the working fluid throughout the system. The required pumping force depends on the operating conditions. Therefore, pump 14 can be connected to sensors 18 to provide signals through information channel 19 for the required pumping force based on ambient conditions like icing or non-icing, and flight conditions like engine start, take-off, cruising or landing. The hot-fluid flow channel 4 can be connected to turbo-expander 3. The flow channel 4 transfers the hot fluid from turbo-expander 3 to an icing sensor 5. When icing conditions do not prevail, an icing sensor 10 can be connected to an icing sensor 5 by hot-fluid flow channel 9. This completely sets the hot fluid flow from hot-fluid flow channel 4 towards icing sensor 10 through hot-fluid flow channel 9. Therefore, during non-icing conditions the working fluid does not flow towards hot-fluid flow channel 6. Icing sensor 10 can be connected to the condenser 12 by vapor return flow channel 11. The working fluid is transferred from icing sensor 10 to condenser 12. The condenser 12 condenses the hot working fluid received from the icing sensor 10. The condensed working fluid is transferred from condenser 12 to a pump 14 through a flow channel 13. Cold fluid flow channel 16 returns the pumped working fluid from pump 14 to the annular finned-tube heat exchanger 1, thus completing the cycle. When icing condition prevails, flow through hot-fluid flow channel 9 between icing sensor 10 and icing sensor 5 is disconnected. Therefore, hot-fluid flow channel 9 becomes non-functional. A helical heating coil 7 is a tube/pipe coiled in a helical manner. The helical heating coil 7 can be installed in the engine's air inlet system (within the annulus). The helical heating coil 7 can be fitted co-axially in the annulus of the engine's air inlet system. The helical heating coil 7 is connected to icing sensor 5 by hot-fluid flow channel 6. The working fluid flow is from icing sensor 5 to helical heating coil 7. The helical heating coil 7 is oriented in such a way that its inlet which has hot working fluid entering it faces the compressor-side of engine's air inlet system while its end which has working fluid (relatively cold) leaving it faces the entry-side of engine (i.e. cold-outlet of the helical heating coil is closer to the engine's entry/opening than its hot-inlet). This creates a cross counter flow arrangement (combination of cross flow and counter flow) between the working fluid and the inlet air, efficiently heating the engine's inlet air and cooling the working fluid. This orientation of the helical heating coil 7 is the 'best and the most efficient' way of heating the engine's inlet air. The helical heating coil 7 operate only during icing conditions, thus heating the inlet air to the compressor. This heating prevents the formation and ingestion of ice. Ice ingestion has adverse effects on performance and life of engine. The helical heating coil 7 plays the role of a primary condenser where the working fluid flowing through it gets cooled. Icing sensor 10 can be connected to helical heating coil 7 by working fluid flow channel 8. The working fluid flow is from helical heating coil 7 to icing sensor 10. Icing sensor 10 can be connected to the condenser 12 by vapor return flow channel 11. The working fluid is transferred from icing sensor 10 to condenser 12. The condenser 12 further condenses/cools the working fluid. The condensed working fluid is transferred from condenser 12 to a pump 14 through a fluid flow channel 13. The cold fluid flow channel 16 returns the pumped working fluid from pump 14 to the annular finned-tube heat exchanger 1, thus completing the cycle.

Figure 3:
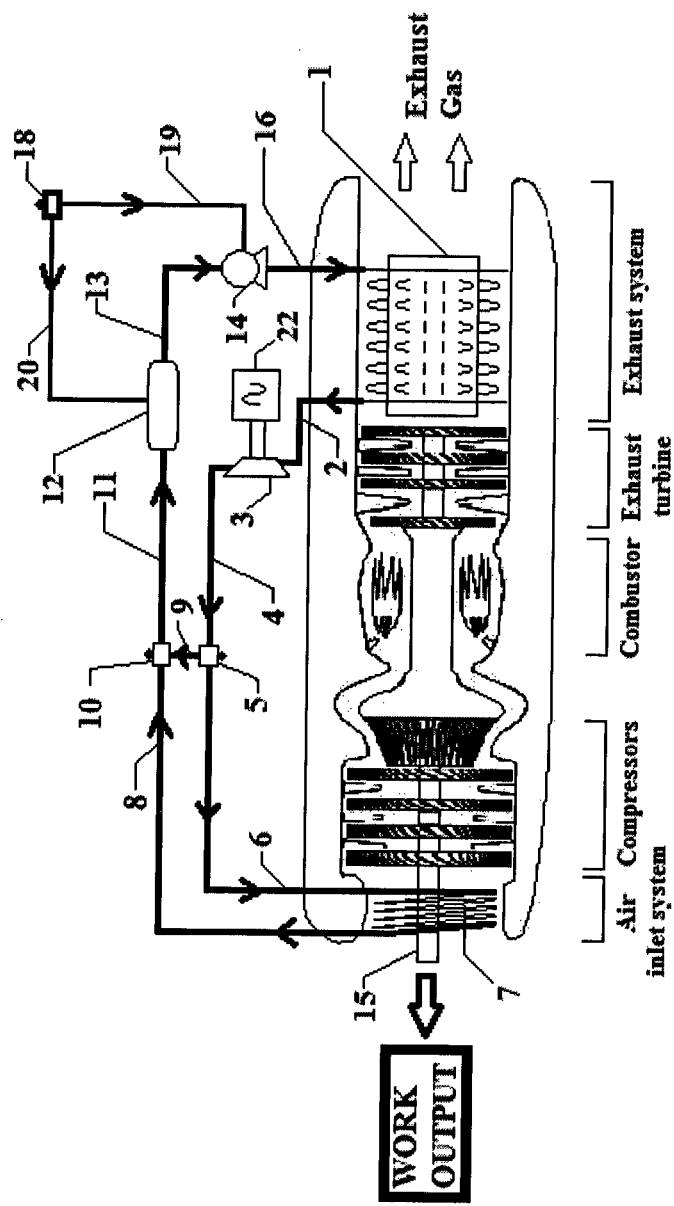
FIG. 3 is a side view of the direct drive shaft powered aircraft gas turbine engine with turbo-expander coupled to electric generator, where the turbo-expander is installed outside engine's framework.

In an alternative representation of an improved direct drive shaft powered aircraft gas turbine engine, depicted in FIG. 3, the turbo-expander 3 can be installed outside engine framework. The turbo-expander 3 can be connected to an electric generator 22 to drive aircraft utility systems and other electric equipment used on the aircraft.

Figure 4:
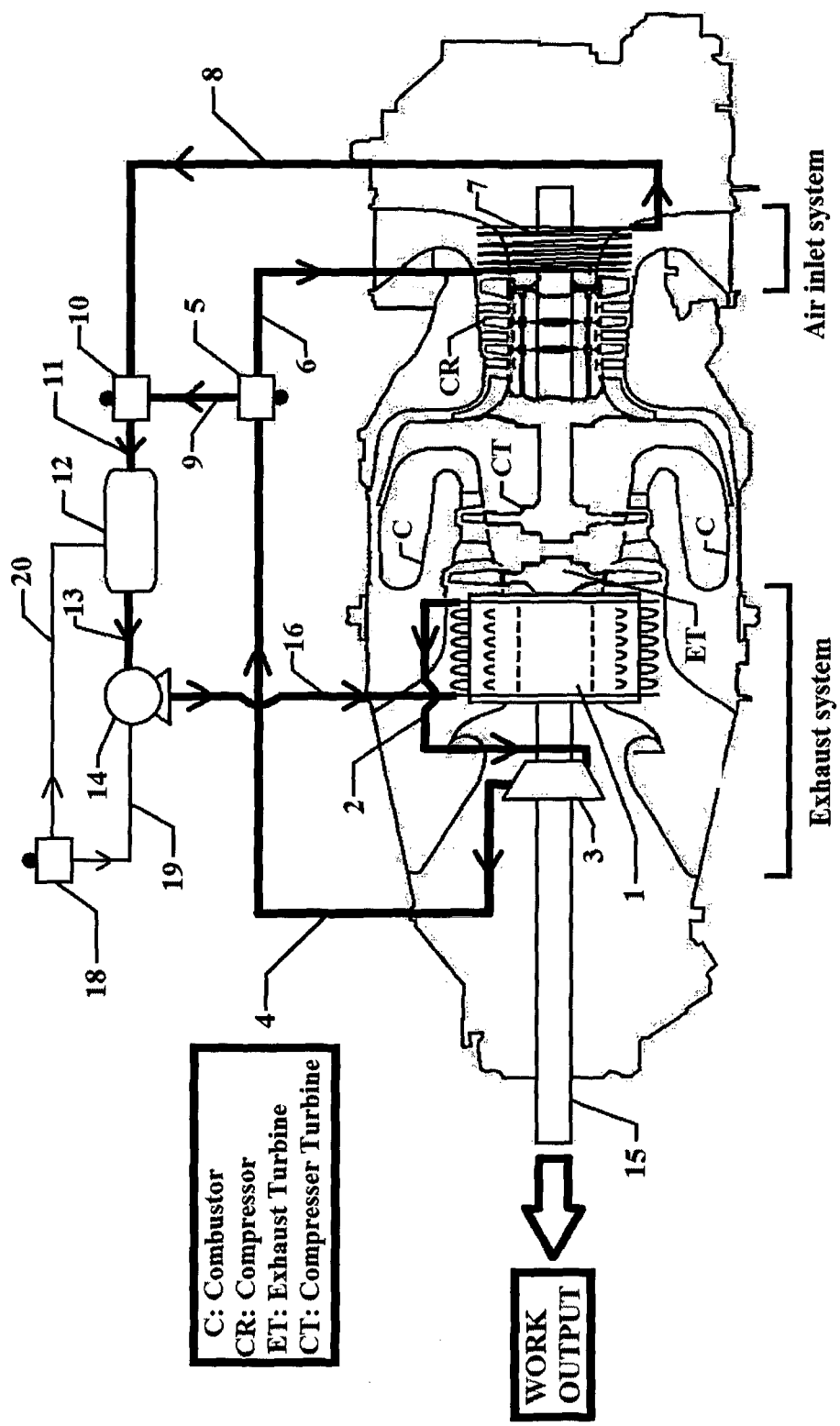
FIG. 4 is a side view of the reverse flow shaft powered aircraft gas turbine engine with turbo-expander on the exhaust shaft.

Additionally, a representation of the present invention is an improved reverse flow shaft powered aircraft gas turbine engine. The depiction in FIG. 4 is a reverse flow shaft powered aircraft gas turbine engine, an annular finned-tube heat exchanger 1 can be installed in the exhaust system. The depiction in FIG. 1 is an annular finned-tube heat exchanger 1. It consists of a set of finned-tubes arranged in circular pattern within the annulus formed by two co-axial metal tubes/pipes/hollow cylinders. For ease in manufacturing, the two co-axial metal tubes/pipes/hollow cylinders can be cut into two halves. The required pattern of the finned tubes can be achieved by welding. The annular region is maintained by providing rigid supports at specific locations along the circumference and the length of the co-axial metal tubes/pipes/hollow cylinders. The rigid supports can be welded between the two co-axial metal tubes/pipes/hollow cylinders or can be formed by using mechanical joints. The finned tubes within each of the half annulus formed (after cutting) are connected/welded along the length of two co-axial half metal tubes/pipes/hollow cylinders, with caps (tubes of U-shape to connect the adjacent finned-tube in order to create 'flat zigzag coil' flow arrangement) except at both the ends. The two ends of each set of 'flat zigzag coil' finned-tubes arranged in circular pattern, are kept open to form a circular parallel-flow arrangement. After the assembly of the finned tubes as described above, the two half annulus can be welded together. All the ends (on the radially outward/outer side) of the finned-tubes in circular arrangement at both ends of the now complete (after welding) metal tube/pipe/hollow cylinder are connected/welded to a fluid channel or tube of circular shape/geometry (i.e. not cross-section wise) to provide parallel flow. This way the annular finned-tube heat exchanger 1 is manufactured. The annular finned-tube heat exchanger 1 fits co-axially in the annulus of the exhaust system of a reverse flow shaft powered aircraft gas turbine engine. The fitting can be done by welding metal brackets on the outer circumference of the annular finned-tube heat exchanger 1 and the inner circumference of the exhaust system or any appropriate method. The turbo-expander 3 can be mounted on exhaust shaft 15. The exhaust shaft 15 generates required work for propulsion and Electrical Control Unit (ECU). The annular finned-tube heat exchanger 1 can be connected to a turbo-expander 3 by vapor flow channel 2. The orientation of the annular finned-tube heat exchanger 1 is very important. The annular finned tube heat exchanger 1 is oriented in such a way that its outlet which has the hot working fluid leaving it, faces the exhaust turbine-side of the engine's exhaust system, while its inlet with cold working fluid entering it faces the exit-side of engine's exhaust system. This creates a cross counter flow arrangement (combination of cross flow and counter flow) between the working fluid and the exhaust gas, efficiently absorbing the thermal energy from exhaust gas to convert the working fluid into vapor. This orientation of the annular finned-tube heat exchanger 1 is the 'best and the most efficient' way of carrying out the heat recuperation process. As exhaust gas heats working fluid in the annular finned-tube heat exchanger 1, the working fluid changes to vapor. The vapor is transferred from the annular finned-tube heat exchanger 1 to the turbo-expander 3 by vapor flow channel 2. The vapor expands in turbo-expander 3 to generate mechanical work output. The condenser 12 can be connected to sensors 18 to provide signals through information channel 20 for the required condensing rate to achieve maximum thermal efficiency based on ambient conditions like icing or non-icing, and flight conditions like engine start, take-off, cruising or landing. The pump 14 drives the working fluid throughout the system. The required pumping force depends on the operating conditions. Therefore, pump 14 can be connected to sensors 18 to provide signals through information channel 19 for the required pumping force based on ambient conditions like icing or non-icing, and flight conditions like engine start, take-off, cruising or landing. The hot-fluid flow channel 4 can be connected to turbo-expander 3. The flow channel 4 transfers the hot fluid from turbo-expander 3 to an icing sensor 5. When icing conditions do not prevail, an icing sensor 10 can be connected to an icing sensor 5 by hot-fluid flow channel 9. This completely sets the hot fluid flow from hot-fluid flow channel 4 towards icing sensor 10 through hot-fluid flow channel 9. Therefore, during non-icing conditions the working fluid does not flow towards hot-fluid flow channel 6. Icing sensor 10 can be connected to the condenser 12 by vapor return flow channel 11. The working fluid is transferred from icing sensor 10 to condenser 12. The condenser 12 condenses the hot working fluid received from the icing sensor 10. The condensed working fluid is transferred from condenser 12 to a pump 14 through a flow channel 13. Cold fluid flow channel 16 returns the pumped working fluid from pump 14 to the annular finned-tube heat exchanger 1, thus completing the cycle. When icing condition prevails, flow through hot-fluid flow channel 9 between icing sensor 10 and icing sensor 5 is disconnected. Therefore, hot-fluid flow channel 9 becomes non-functional. A helical heating coil 7 is a tube/pipe coiled in a helical manner. The helical heating coil 7 can be installed in the engine's air inlet system (within the annulus). The helical heating coil 7 can be fitted co-axially in the annulus of the engine's air inlet system. The helical heating coil 7 is connected to icing sensor 5 by hot-fluid flow channel 6. The working fluid flow is from icing sensor 5 to the helical heating coil 7. The helical heating coil 7 is oriented in such a way that its inlet which has hot working fluid entering it faces the compressor-side of engine's air inlet system while its end which has working fluid (relatively cold) leaving it faces the entry-side of engine (i.e. cold-outlet of the helical heating coil is closer to the engine's entry/opening than its hot-inlet). This creates a cross counter flow arrangement (combination of cross flow and counter flow) between the working fluid and the inlet air, efficiently heating the engine's inlet air and cooling the working fluid. This orientation of the helical heating coil 7 is the 'best and the most efficient' way of heating the engine's inlet air. The helical heating coil 7 operate only during icing conditions, thus heating the inlet air to the compressor. This heating prevents the formation and ingestion of ice. Ice ingestion has adverse effects on performance and life of engine. The helical heating coil 7 plays the role of a primary condenser where the working fluid flowing through it gets cooled. Icing sensor 10 can be connected to the helical heating coil 7 by working fluid flow channel 8. The working fluid flow is from helical heating coil 7 to icing sensor 10. Icing sensor 10 can be connected to the condenser 12 by vapor return flow channel 11. The working fluid is transferred from icing sensor 10 to condenser 12. The condenser 12 further condenses/cools the working fluid. The condensed working fluid is transferred from condenser 12 to a pump 14 through a fluid flow channel 13. The cold fluid flow channel 16 returns the pumped working fluid from pump 14 to the annular finned-tube heat exchanger 1, thus completing the cycle.

Figure 5:
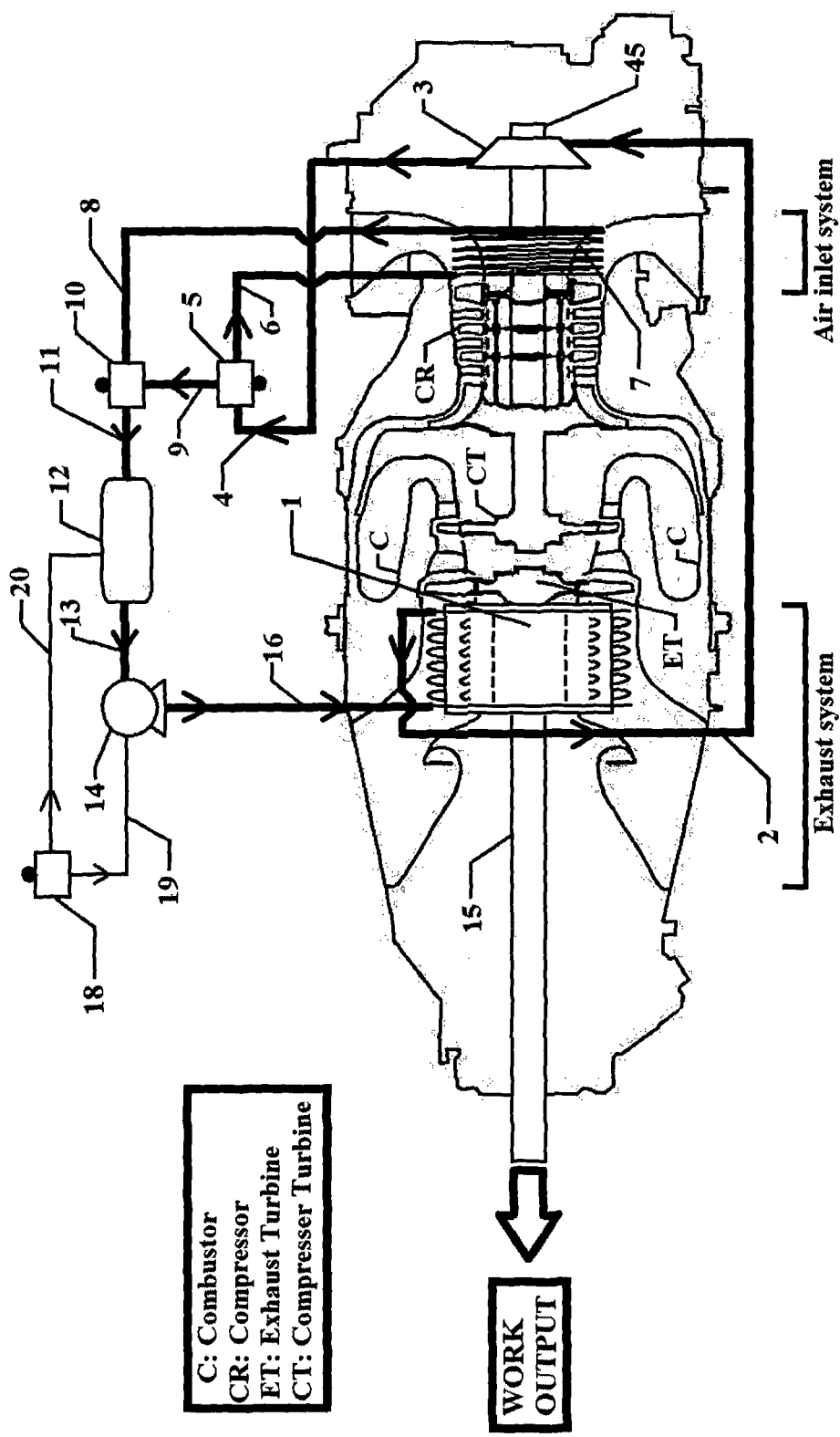
FIG. 5 is a side view of the reverse flow shaft powered aircraft gas turbine engine with turbo-expander on the compressor shaft.

In the first alternative representation of an improved reverse flow shaft powered aircraft gas turbine powered engine, depicted in FIG. 5, the turbo-expander 3 can be mounted on the compressor shaft 45.

Figure 6:
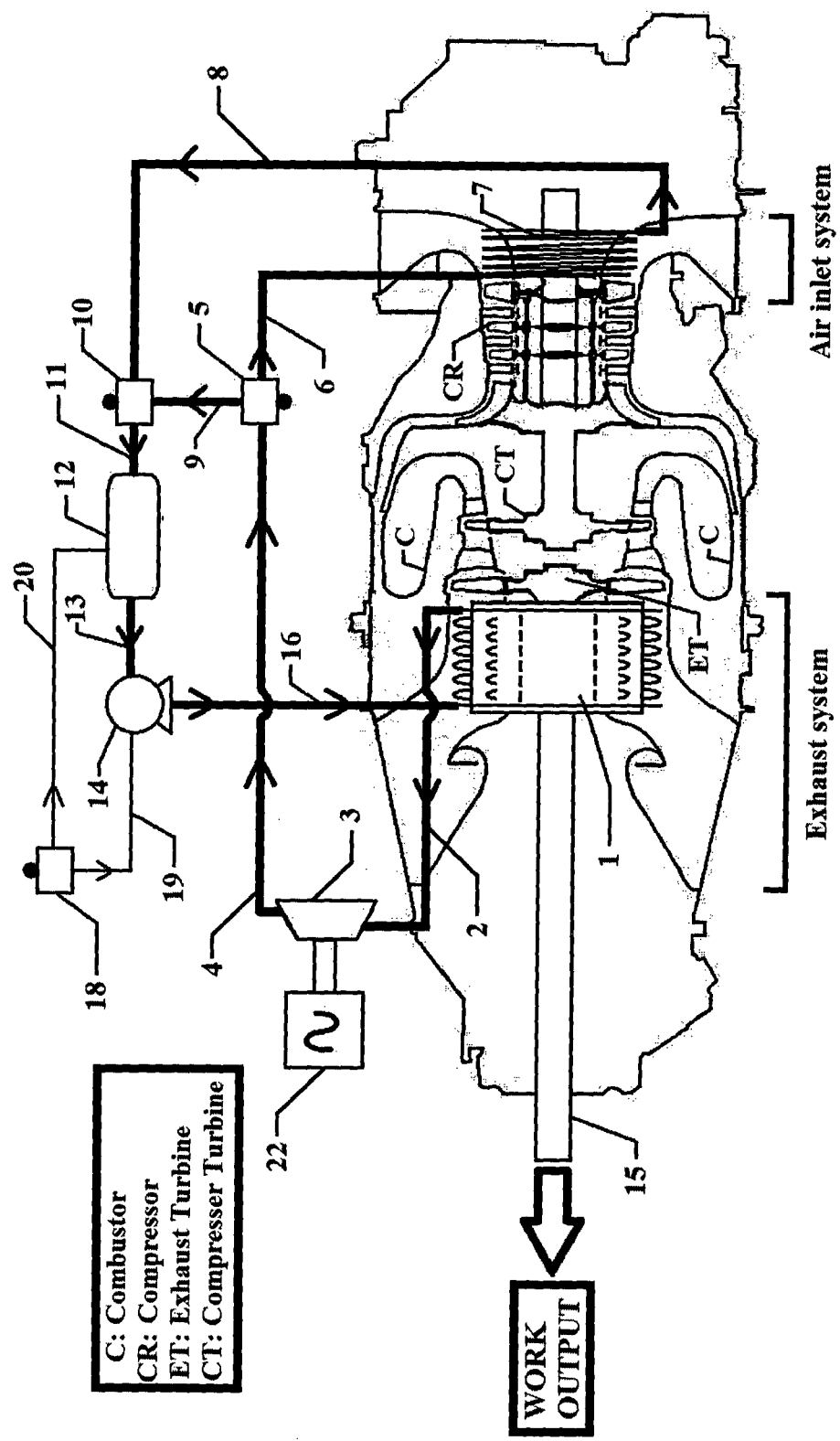
FIG. 6 is a side view of the reverse flow shaft powered aircraft gas turbine engine with turbo-expander coupled to an electric generator, where the turbo-expander is installed outside the engine framework.

In the second alternative representation of an improved reverse flow shaft powered aircraft gas turbine powered engine, depicted in FIG. 6, the turbo-expander 3 can be installed outside engine framework. The turbo-expander 3 can be connected to an electric generator 22 to drive aircraft utility systems and other electric equipment used on the aircraft.

In FIG. 2, FIG. 3, FIG. 4, FIG. 5, and FIG. 6 the flow channel 2, 4, 6, 8, 9, 11, 13, 16 for the transfer of working fluid, can be in the form of tube or pipe. The tube/pipe can be composed of aluminum, stainless steel, alloy steel, carbon steel, copper or any other appropriate material. The tube/pipe can have a circular cross section or a polygonal cross section. Additionally, the tube/pipe can be provided with insulation coating to prevent heat losses to the surroundings. The insulation coating for the tube/pipe can be composed of mineral wool, glass wool, flexible elastomeric foams, rigid foams, polyethylene, cellular glass, aerogel or any other appropriate material.

The present invention in FIG. 2, FIG. 3, FIG. 4, FIG. 5, and FIG. 6 is a closed system. The total quantity of the working fluid in the system remains constant at all operating conditions. During the non-icing conditions, there will be 'stagnant' working fluid inside the helical heating coil 7, flow channel 6, and flow channel 8. Therefore, the working fluid selection is a very important step and care must be taken that the freezing temperature of the working fluid is lesser than the typical temperatures at which icing occurs at different altitudes during the flight.

In FIG. 1, FIG. 2, FIG. 3, FIG. 4, FIG. 5, and FIG. 6 the annular finned-tube heat exchanger 1 can be composed of high grade carbon steel, stainless steel, copper, brass, aluminum or any other appropriate material, where the length of this heat exchanger depends on design. The annular finned-tube heat exchanger 1 can be made uniformly with one material or it can be made of different material for different subcomponents in it. The number of finned-tubes and the diameter of tubes, in an annular finned-tube heat exchanger 1 depends on design. The fins on the tubes in an annular finned-tube heat exchanger 1 can be radial fins and the shape of finned-tubes can be circular or polygonal, or any other efficient fin-type. The fins on the tubes can have triangular, rectangular, concave parabolic or convex parabolic cross section. The fins can be continuous spirally wound fins or helically wound fins, both may have corrugations on it. The thickness of the fins and the number of fins depends on design requirements.

In FIG. 2, FIG. 3, FIG. 4, FIG. 5, and FIG. 6 the helical heating coil 7 is a helically coiled tube/pipe for heating the engine's inlet air during icing conditions. The helical heating coil 7 may have fins. These fins may be circular in shape or polygonal, and the thickness of fins depends on the design. The diameter of the tube/pipe, number of coils and the total length of the helical heating coil 7 depends on the design requirement.

The representations depicted in the drawings and discussed above are exemplary of various representations that may be made within the scope of the attached claims. It is contemplated that various other arrangements may be employed, and the material for each component may be selected from various materials other than those particularly mentioned. It is the applicant's intention that the scope of the patent issuing henceforth will be limited by the scope of the attached claims.

I claim:

1. A thermal energy recuperating system for a shaft-powered aircraft gas turbine engine to recover the thermal energy from the engine exhaust gas, the thermal energy recuperating system comprising:
   a. an annular-shaped heat exchanger installed within an engine exhaust system and co-axial with an exhaust shaft, the annular-shaped heat exchanger comprising:
   an annulus formed by two cylinders which are hollow and co-axial, and the annulus is maintained by a plurality of supports;
   a plurality of continuous zigzag conduits passing through the annulus and positioned along a length-wise direction of the annulus, wherein each of said plurality of continuous zigzag conduits includes a first end located at a first side of the annulus and a second end located at a second side of the annulus, wherein the zigzag arrangement is formed by installing a plurality of tubes along the length-wise direction of the annulus, a plurality of bent tubes which connect tubes of said plurality of tubes to form the continuous zigzag shaped conduit;
   a first circular shaped tube located on the first side of the annulus and a second circular shaped tube located on the second side of the annulus, wherein both the first circular shaped tube and the second circular shaped tube comprise a head tube and a plurality of tubular ports, wherein the plurality of tubular ports is equal to the number of the plurality of continuous zigzag conduits, wherein a first end of each of the plurality of continuous zigzag conduits is connected to a respective one of said tubular ports on the first circular shaped tube and a second end of each of the plurality of continuous zigzag conduits is connected to a respective one of said tubular ports on the second circular shaped tube to form a plurality of flow passages along the length-wise direction of the annulus and between the head tube of the first circular shaped tube and the head tube of the second circular shaped tube;
   a working fluid contained within the plurality of flow passages which absorbs the thermal energy from the engine exhaust gas as the engine exhaust gas flows through the annulus and flows over the tubes of the zigzag conduits to convert the working fluid into a vapor;
   b. a turbo-expander, which receives the vapor of the working fluid from the annular-shaped heat exchanger, and the vapor of the working fluid drives the turbo-expander;
   c. a first condenser installed in an air inlet system of the engine and a second condenser, a first conduit fluidly connecting the turbo expander to the first condenser, a second conduit connecting the first condenser to the second condenser, a third conduit connecting the second condenser to the annular-shaped heat exchanger, a fourth conduit connecting the annular-shaped heat exchanger to the turbo expander, a bypass conduit connected to the first and second conduit, and a valving system located on the first conduit and connected to the bypass conduit that interacts with at least one electronic sensor to regulate the flow of the working fluid depending on the ambient condition, where the valving system selectively routes the working fluid along a first flow path from the turbo expander to the second condenser via the first condenser, and a second flow path, which the working fluid from the turbo-expander bypasses the first condenser by way of the bypass conduit and flows through the second condenser; and d. a pump which receives the working fluid from the second condenser and pumps the working fluid to the annular-shaped heat exchanger.

2. The system of claim 1 where the annular-shaped heat exchanger includes a plurality of fins.

3. The system of claim 1, where the working fluid is a refrigerant.

4. The system of claim 1, where the working fluid is a siloxane.

5. The system of claim 1, where the turbo-expander is operatively connected to an electric generator.

6. The system of claim 1, wherein the turbo-expander is operatively installed on a shaft.

7. The system of claim 1, wherein the turbo-expander is operatively connected to a compressor.

8. The system of claim 1, where the turbo-expander is operatively connected to a turbo-machine.

9. An annular-shaped heat exchanger for exchanging heat with a fluid flow, the annular-shaped heat exchanger comprising:
  a. an annulus formed by two cylinders which are hollow and co-axial, and the annulus is maintained by a plurality of supports;
  b. a plurality of continuous zigzag conduits passing through the annulus and positioned along a length-wise direction of the annulus, wherein each of said plurality of continuous zigzag conduits includes a first end located at a first side of the annulus and a second end located at a second side of the annulus, wherein the zigzag arrangement is formed by installing a plurality of tubes along the length-wise direction of the annulus, a plurality of bent tubes which connect tubes of said plurality of tubes to form the continuous zigzag shaped conduit;
  c. a first circular shaped tube located on the first side of the annulus and a second circular shaped tube located on the second side of the annulus, wherein both the first circular shaped tube and the second circular shaped tube comprise a head tube and a plurality of tubular ports, wherein the plurality of tubular ports is equal to the number of the plurality of continuous zigzag conduits, wherein a first end of each of the plurality of continuous zigzag conduits is connected to a respective one of said tubular ports on the first circular shaped tube and a second end of each of the plurality of continuous zigzag conduits is connected to a respective one of said tubular ports on the second circular shaped tube to form a plurality of flow passages along the length-wise direction of the annulus and between the head tube of the first circular shaped tube and the head tube of the second circular shaped tube;
  d. a plurality of fins positioned along the plurality of zigzag conduits.

10. A closed cycle heat exchange system comprising:
  a. an annular-shaped heat exchanger for exchanging heat with a hot fluid flowing, through a conduit, the annular-shaped heat exchanger comprising:
    an annulus formed by two cylinders which are hollow and co-axial, hollow, tapered and co axial and the annulus is maintained by multiple a plurality of supports;
    a plurality of continuous zigzag conduits passing through the annulus and positioned along a length-wise direction of the annulus, wherein each of said plurality of continuous zigzag conduits includes a first end located at a first side of the annulus and a second end located at a second side of the annulus, wherein the zigzag arrangement is formed by installing a plurality of tubes along the length-wise direction of the annulus, a plurality of bent tubes which connect tubes of said plurality of tubes to form the continuous zigzag shaped conduit;
    a first circular shaped tube located on the first side of the annulus and a second circular shaped tube located on the second side of the annulus, wherein both the first circular shaped tube and the second circular shaped tube comprise a head tube and a plurality of tubular ports, wherein the plurality of tubular ports is equal to the number of the plurality of continuous zigzag conduits, wherein a first end of each of the plurality of continuous zigzag conduits is connected to a respective one of said tubular ports on the first circular shaped tube and a second end of each of the plurality of continuous zigzag conduits is connected to a respective one of said tubular ports on the second circular shaped tube to form a plurality of flow passages along the length-wise direction of the annulus and between the head tube of the first circular shaped tube and the head tube of the second circular shaped tube;
    a working fluid contained within the plurality of flow passages which absorbs the thermal energy from the engine exhaust gas as the engine exhaust gas flows through the annulus and flows over the tubes of the zigzag conduits to convert the working fluid into a vapor;
  b. a turbo-expander, which receives the vapor of the working fluid from the annular-shaped heat exchanger, and the vapor of the working fluid drives the turbo-expander;
  c. a condenser, which receives the working fluid from the turbo-expander and condenses the working fluid; and
  d. a pump, which receives the working fluid from the condenser and pumps the working fluid to the annular-shaped heat exchanger.

11. The system of claim 10, where the annular-shaped heat exchanger includes a plurality of fins.

12. The system of claim 10, where the turbo-expander is operatively connected to an electric generator.

13. The system of claim 10, where the turbo-expander is operatively connected to a compressor.

14. The system of claim 10, where the turbo-expander is operatively connected to a turbo-machine.

15. The system of claim 10, where the turbo-expander is operatively installed on a shaft.

16. The system of claim 10, where the working fluid is a refrigerant.

17. The system of claim 10, where the working fluid is a siloxane.

* * * * *